Dec. 24, 1929. W. O. KUEHN ET AL 1,740,945
SAFETY LOCK FOR GAS COCKS
Filed Feb. 25, 1929
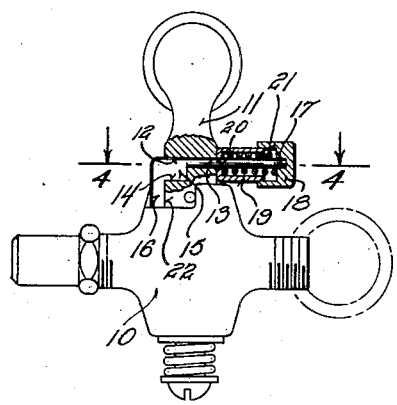
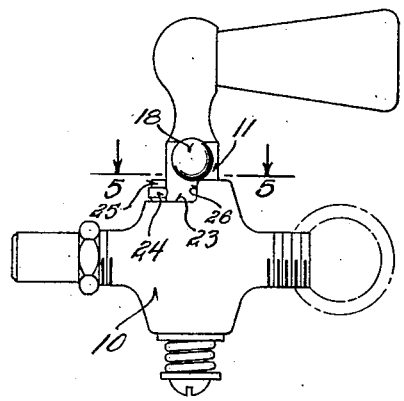
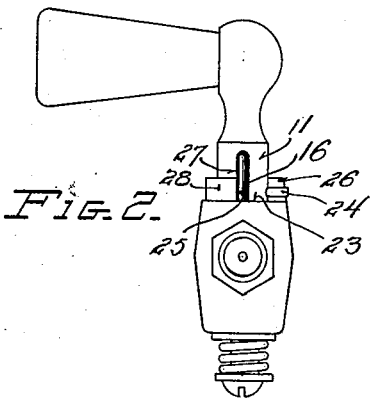
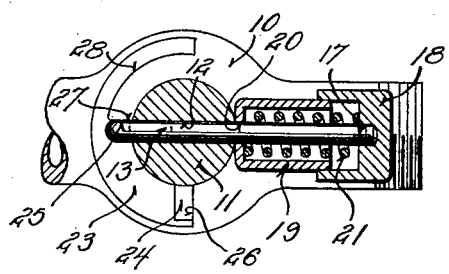
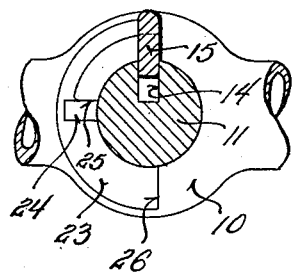
Inventors
WALDEMAR O. KUEHN
THEODORE WESOLOWSKI
By Ralph L. Brown
Attorney Patented Dec. 24, 1929

1,740,945

UNITED STATES PATENT OFFICE

WALDEMAR O. KUEHN AND THEODORE WESOLOWSKI, OF MILWAUKEE, WISCONSIN

SAFETY LOCK FOR GAS COCKS

Application filed February 25, 1929. Serial No. 342,512.

This invention relates to safety locks for gas cocks.

The primary object of the invention is to provide novel and improved means for locking gas cocks to prevent their accidental manipulation either by the housewife or by small children.

A further object is to provide an improved safety lock for gas cocks which is simple in construction and operation and one which may be manufactured at an extremely low cost.

Other objects and advantages will appear from the following description of an illustrative embodiment of the present invention.

In the drawings:—

Fig. 1 represents a side elevational view of a gas cock wth the valve in closed position and having parts broken away to show the construction of locking means for the same.

Fig. 2 represents an end elevational view of the gas cock shown in Fig. 1.

Fig. 3 represents a side elevational view of the gas cock with the valve in open position.

Fig. 4 is a sectional view on the line 4—4 of Fig. 1.

Fig. 5 is a sectional view on the line 5—5 of Fig. 3.

In the embodiment of the present invention, chosen for illustrative purposes, a gas cock of standard form has been shown. The body portion 10 of the gas cock may well be any of the numerous gas cocks in commercial use today. The rotatable valve stem or plug 11 functions in a manner identical with present practice and its construction is identical save for the application of the locking means which forms the subject matter of the present invention and which will hereinafter be described in detail.

The valve stem 11 is provided with a transverse aperture 12 to receive a pin 13. A mouth 14 at one end of the aperture 12 is formed to receive an enlarged flat portion 15 of the pin 13. The mouth 14 and enlarged portion 15 of the pin co-act to prevent axial rotation of the pin 13. One end of the pin is fashioned in the form of a detent lug 16 which depends from the pin 13. The other end 17 of the pin which extends through the thin neck of the valve stem 11 is provided with screw threads to engage a push button 18. A thimble 19 is provided with an aperture 20 adapted to receive the portion of the pin 13 which extends beyond the valve stem 11. A coil spring 21 surrounds the extended end 17 of the pin 13 and is housed within the thimble exerting pressure upon the push button 18 to normally retain a face 22 of the foot 16 in contact with the side of the valve stem 11 when the valve is in locked position.

The manipulation and operation of this locking means is extremely simple. As previously stated the gas cock is or may well be of standard form and consequently is provided with the usual recess 23 at its upper end. This recess 23 accommodates the stop pin 24 carried by the valve stem and the end walls 25 and 26 of the recess serve to prevent the rotation of the stem beyond the normally open and closed positions of the valve. To insure against accidental manipulation of the valve the locking means is so positioned on the stem 11 that the side 27 of the detent lug 16 engages with the end wall 25 of the recess 23 when the valve is in its closed position. Before the valve can be opened the lug 16 must be freed from its engagement with the end wall 25 of the recess. This we accomplish by grasping the valve handle in the usual manner and pressing the button 18 with the thumb. Pressure on the button 18 compresses the spring 21 and permits the detent 16 to be forced outwardly against the spring pressure until it has been freed from engagement with the wall 25 of the recess. At this time the handle may be rotated in the usual manner to open the cock and the face 22 will ride freely on surface 28 of the body portion 10. While the valve is being rotated into closed position the lug 16 will ride along the surface 27 until it reaches the recess 23 and then under the action of the spring 27 it will be snapped home with the face 22 in contact with the side of the stem to lock the valve in closed position. The valve cannot then be rotated until the locking means has been released by pressing the button as hereinabove described. It will be noted that by arranging the pin 13 at right angles to and below handle the push button 18 is conveniently arranged for manipulation by the thumb of the operator's hand which is on the handle, so that although opening of the valve requires manipulation of the pin as well as the handle, both of these operations may be performed with one hand only.

From the foregoing it may readily be seen that a simple and effective locking means has been provided which will insure against accidental opening of gas cocks and hence eliminate a constant fear in the home, that of having gas turned on inadvertently.

While the invention has been described in considerable detail in the foregoing specification, it is understood that various changes may be made without departing from or sacrificing any of the advantages hereinafter claimed.

We claim:

1. In a gas cock the combination of a valve housing, a valve plug rotatable in said housing, an operating stem projecting upwardly from said plug, a handle extending laterally from the end of said stem, a stop pin in said stem, a cut-away portion in said housing for receiving said pin and coacting with said pin to limit rotation of said plug, said stem having a transverse perforation therein disposed below and at right angles to said handle, said perforation terminating in a narrow mouth, a locking pin projecting through said perforation, an enlarged flat portion on one end of said pin engaged in and guided by said narrow mouth, a depending detent lug projecting from said enlarged portion, said detent being disposed to interlock within said cut-away portion when said valve plug is in valve closing position to thereby releasably retain the valve in closed position, said detent also being disposed to ride on said valve housing during rotation of said plug toward and from closed position, an operating button on said locking pin below and at one side of said handle, and a compression spring between said button and said valve stem for urging said detent inwardly against said valve body or in interlocking engagement with said cut-away portion.

2. In a gas cock the combination of a valve housing, a valve plug rotatable therein, an operating stem projecting upwardly from said plug, a handle projecting laterally from the end of said stem, a stop pin in said stem, a cut-away portion in said housing for receiving said pin and coacting with said pin to limit rotation of said plug, said stem having a transverse perforation therein disposed below and at right angles to said handle, said perforation terminating in a narrow mouth, a locking pin projecting through said perforation, an enlarged flat portion on one end of said pin engaged in and guided by said narrow mouth, a depending detent lug projecting from said enlarged portion, said detent being disposed to interlock within said cut-away portion when said valve plug is in closed position and to ride on said housing during rotation of said plug toward and from closed position, a push button on the other end of said locking pin, said button being disposed below and at one side of said handle, a compression spring between said button and stem for urging said detent against said housing and into said cut-away portion, a sleeve surrounding said spring, an inturned flange on the inner end of said sleeve, said spring co-acting with said flange to hold the same against said stem, and a peripheral flange on said button surrounding and closing the outer end of said sleeve.

In witness whereof we hereunto subscribe our names this 23d day of February, 1929.

WALDEMAR O. KUEHN.
THEODORE WESOLOWSKI.